United States Patent Office 2,845,446
Patented July 29, 1958

2,845,446
COMPOSITION OF MATTER

Edward C. Soule, deceased, late of Niagara Falls, N. Y., by Eleanore Benner Soule, executrix, Niagara Falls, N. Y., assignor to Olin Mathieson Chemical Corporation, a corporation of Virginia No Drawing. Application October 20, 1953
Serial No. 387,327

1 Claim. (Cl. 260—438)

This invention relates to a novel composition of matter representing double compound reaction products of copper sulfate and dihydrazine oxalate which have value as fungicides. This application is a continuation-in-part of application Serial No. 280,661, filed April 4, 1952, now abandoned, which in turn is a continuation-in-part of application Serial No. 203,803, filed December 30, 1950 now U. S. Patent No. 2,659,688, issued November 17, 1953. The double compounds of copper sulfate and dihydrazine oxalate are obtained by admixing a dilute aqueous solution of dihydrazine oxalate (also designated as hydrazine monoxalate) with a dilute aqueous copper sulfate solution and recovering the desired product as a fine precipitate.

In the above mentioned applications, it is disclosed that materials of this type have valuable thallophyticidal properties, and thus have utility in the control of common molds, algae and fungi. In contrast to the unsatisfactory compositions for controlling fungi previously known to the art, the double compounds of copper sulfate and dihydrazine oxalate of the present invention are unusual in that although substantially water insoluble, they provide readily available and effective fungicides. Thus, they provide insoluble copper dusting compositions that are highly potent, but at the same time produce very little or no burning of the host plants. These results are particularly unexpected because of the substantial insolubility of the double compounds. The copper sulfate-dihydrazine oxalate double compounds also appear in comprehensive tests at use levels to be completely non-toxic to animals and fish so that they have particular value as algaecides.

The new compositions in general may be applied by spraying or dusting. Although the copper sulfate-dihydrazine oxalate double compounds are readily prepared in pure form from their components and may be used undiluted, they are advantageously incorporated in dry or liquid compositions in proportions of about 0.5 to 10% by weight. The balance of the compositions is composed of a pesticidal base material which may be pesticidally active or inactive, e. g. elemental sulfur, inert clays, water, hydrocarbons or other common carriers and dispersants. For example, if the copper sulfate-dihydrazine oxalate double compounds are to be used in a dusting composition, they may be admixed with a diluent in about 0.5 to 75% by weight on the composition. However, prior to use the composition should be further diluted so that the concentration of the active ingredient is within the range of about 0.5 to 10% by weight. Suitable powdered carriers may be talc, pyrophyllite, gypsum, chalk, fuller's earth, kieselguhr, kaolin and China clay. The novel compostions may also be applied to plant surfaces in the form of solutions, emulsions, as a wettable powder or as an aerosol. The copper sulfate-dihydrazine oxalate double compounds are soluble in acetone and may be employed in hydrocarbons such as benzene, kerosene, toluene and xylene or mixtures thereof. If the composition be utilized as an emulsion or as a wettable powder, a surface active agent may be added with advantage. Suitable surface active agents are rosin soaps, fish-oil soaps, sulfite lye, long chain alcohols, sulfurated oils such as Turkey red oil, and mahogany soaps or petroleum sulfonates.

The preparation and pesticidal activity of the novel compositions of matter are illustrated in the following examples.

Example I

An aqueous solution of 1600 grams of anhydrous copper sulfate, cooled to below 20° C., was added with vigorous stirring to a similarly cooled solution of 960 grams of dihydrazine oxalate in water. Precipitation of the product was instantaneous and substantially quantitative. The precipitate was filtered and washed with distilled water until the filtrate was colorless indicating complete removal of excess copper sulfate. The product was then washed with methanol, dried in air and analyzed. The results of the analysis follow.

|  | Cu, percent | N, percent | $SO_4$, percent | $C_2O_4$, percent |
|---|---|---|---|---|
| Analysis | 26.3 | 11.2 | 36.0 | 21.0 |
| Calc. for $(CuSO_4)_2 \cdot (N_2H_5)_2C_2O_4$ | 26.8 | 11.8 | 40.5 | 18.5 |

As indicated by the above analysis, the double compound of Example I approximates that of the formula $(CuSO_4)_2 \cdot (N_2H_5)_2C_2O_4$. However, it will be appreciated that in formations of double compounds the reaction product is frequently complex and may contain several combinations of the separate compounds reacted. It was chosen to designate the compound approximating the formula $(CuSO_4)_2 \cdot (N_2H_5)_2C_2O_4$ as copper sulfate dihydrazinium oxalate.

Example II

A solution of 169 pounds of $CuSO_4 \cdot 5H_2O$ in 506 pounds of water was prepared and cooled to 6° C. A solution of dihydrazine oxalate was prepared by adding 28 pounds of 94% hydrazine to 250 pounds of water with agitation and neutralizing with 57 pounds of oxalic acid dihydrate to a pH of 6 at 20° C. The solution was cooled to 3° C. and added slowly to the copper sulfate solution. The temperature of the mixture after the precipitation was 8° C. It was filtered, washed with cold water and dried as much as possible on the filter. The cake was transferred to a vacuum shelf dryer where it was maintained for 16 hours at 120° F. and 29 inches Hg vacuum. The cake was broken into ¼ inch lumps and dried for an additional 7 hours under the same conditions. The dried solid was passed through a jaw crusher and then micropulverized to obtain the product, 98.3% of which passed a 325 mesh sieve. This product was analyzed and contained 27.6% copper, 11.2% nitrogen, 39.2% $SO_4$ and 19.8% $C_2O_4$.

Example III

The copper sulfate-dihydrazine oxalate double compounds of Examples I and II were tested for inhibition of spore germination of treated spores of plant pathogen *Monilinia fructicola*, a measure of its effectiveness against fungi. The tests were conducted by incubating various dilutions of spore and of the component to be tested in a nutrient medium for 24 hours at 20° C. The amount of inhibition is calculated from a count of the spores in the various test and control dilutions and is expressed as the ED–50 dose, i. e. the minimum dose in parts per million resulting in 50% inhibition of germination. The ED–50 dose for the double compound of Example I was 16 p. p. m. and for the double compound of Example II was 13 p. p. m., indicating that very low dilutions of the compounds are effective in preventing spore germination and achieving excellent fungicidal results.

*Example IV*

A copper sulfate-dihydrazine oxalate double compound having a copper content of 21.1% and a nitrogen content of 10.9% was tested for inhibition of spore germination of treated spores of the plant pathogen *Monilinia fructicola*. This double compound apparently approximated that of the formula $CuSO_4 \cdot (N_2H_5)HC_2O_4$ which has a copper content of 22.3% and a nitrogen content of 9.95%. The test was conducted by incubating various dilutions of spores and of the component to be tested in a nutrient medium for 24 hours at 20° C. The ED-50 dose for this double compound was 13 p. p. m. indicating that very low dilutions of the compound are effective in preventing spore germination and achieving excellent fungicidal results.

*Example V*

The copper sulfate-dihydrazine oxalate double compound of Example IV was tested on pea seeds to determine its effectiveness against damping off organisms. Pea seeds were admixed with the finely pulverized undiluted compound in the proportion of 1 milligram of compound per seed and rolled in a jar for ten to twenty minutes. Several rows of seeds were then placed in soil known to be infested with seed decay damping off organisms together with several rows of seeds treated with Spergon, a standard seed protectant, as a reference compound. The number of plants emerging after 7 and 14 days was counted. The rating for this copper sulfate-dihydrazine oxalate double compound, which is the ratio of the corrected percent of emergence of seeds treated with the double compound to the corrected percent of emergence of the Spergon treated seeds, was 1.15.

What is claimed is:

A method of preparing a copper sulfate-dihydrazine oxalate complex which consists in reacting an aqueous solution of copper sulfate cooled below 20° C. by mixing with an aqueous solution of dihydrazine oxalate cooled below 20° C., and then separating the resulting precipitate from the aqueous reaction mixture.

References Cited in the file of this patent

UNITED STATES PATENTS 2,659,688 Soule _____ Nov. 17, 1953

OTHER REFERENCES

Turrentine: J. Am. Chem. Soc., vol. 32, pp. 577–81 (1910).

Hoffman et al.: Ber., vol. 46 (2), page 1461 (1913).

Franzen et al.: Zeitschrift für anorganische chemie, vol. 60, p. 287.